Patented Aug. 22, 1933

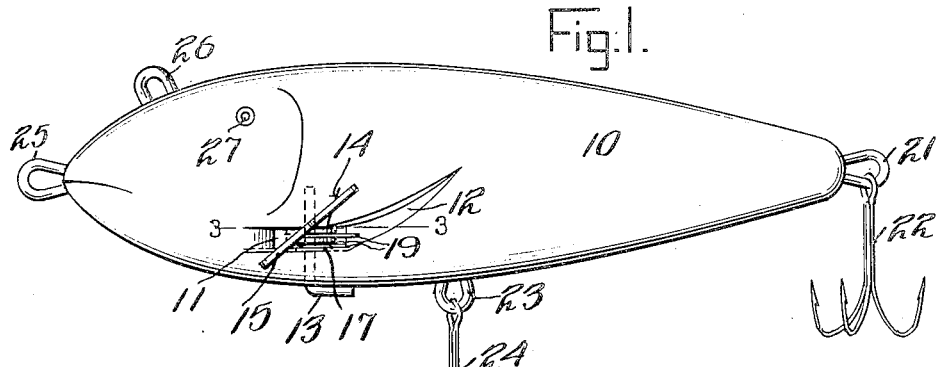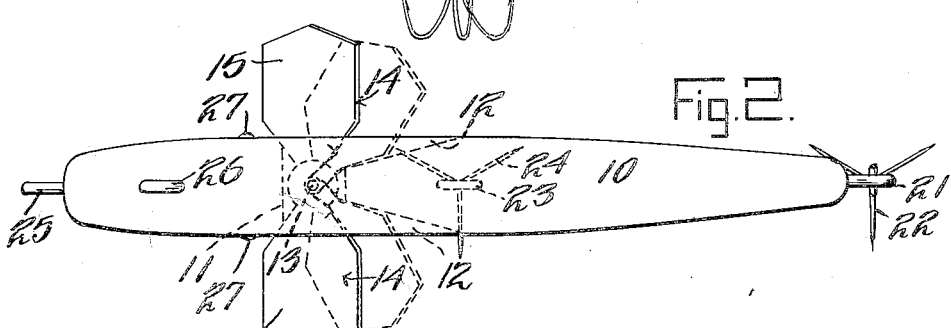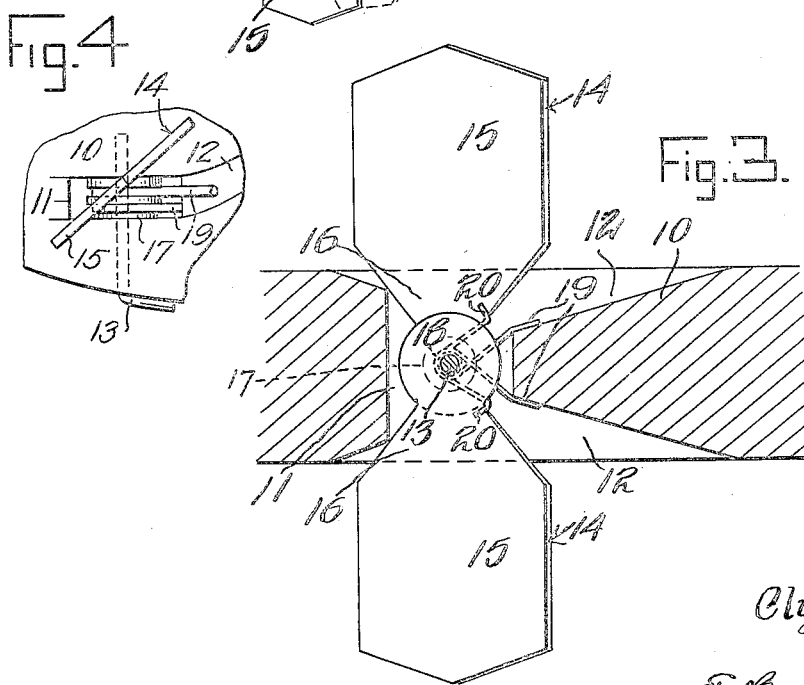

1,923,623

UNITED STATES PATENT OFFICE 1,923,623

FISH LURE

Clyde C. Hoage, Tower, Minn.

Application May 2, 1932. Serial No. 608,781

6 Claims. (Cl. 43—46)

This invention relates to artificial fish lures and the object of the invention is to provide a lure which is attractive to fish and which due to its construction simulates the action of a live minnow when a series of jerks are transmitted to it as it is drawn through the water, all of which will hereinafter be more fully described and claimed.

Referring to the accompanying drawing which is made a part hereof and on which similar reference characters indicate similar parts, Figure 1 is a side view in elevation of the lure, Figure 2, a plane view of the lure, Figure 3, a section on line 3—3 of Figure 1, and Figure 4 is an enlarged detail view of the mounting of the fins.

In the drawing reference numeral 10 indicates the body portion of the lure formed of any suitable material and so designed and shaped that it offers little resistance when being cast or retrieved from the water. The body 10 is provided with a slot 11 extending therethrough at a point back of the gills. The rear portion of the slot is cut back on each side to form the grooves 12, the purpose of which will be described later.

A pin or screw 13 extends upwardly from the bottom through the slot to form a shaft on which the fins 14 are mounted. The fins 14 are formed of any suitable material, preferably metal, and project outwardly from the slot on each side of the lure. The projecting portions 15 of the fins 14 are bent or twisted so that the forward edge is below and the rear edge is above the horizontal plane. The inner ends 16 are narrowed and are pivotally secured on the pin 13. A washer 17 is provided around the pin below the inner ends of the fins 14. Springs 18 are mounted around the pin 13, one end 19 of which rests in the groove 12 and the other end 20 against the rear edge of the inner end 16 of the fins normally holding the fins substantially perpendicular to the body 10 as shown in Figure 1.

The tail end of the body is provided with an eyelet 21 which serves as an anchor for a gang hook 22. A similar gang hook 24 is suspended by the eyelet 23 from the underside near the center of the body portion. Line securing eyes 25 and 26 are anchored at the head end at and above the center thereof.

Eyes 27 formed of any suitable material are secured on the head end. Suitable markings and color schemes may be painted or otherwise applied to the body portion to represent scales, gills, etc. After the desired color and design has been applied the lure may be lacquered to preserve and make the finish more lasting.

The use and action may be described as follows:

When the lure is drawn through the water, the pressure of the water will cause the fins to be forced rearwardly to partially collapse into the grooves 12, as shown in dotted lines in Figure 2, and as it is moved along causes it to have a smooth natural fish-like action. The fins 14 being independent of each other give the fisherman an opportunity to manipulate the lure without the limitation placed upon him when the minnow has only a dead action. The action of the springs impart energy to the fins when they are brought into contact with the water. Unlike any other artificial minnow or lure it imitates a living minnow when a series of jerks are brought to bear on it by a slight tipping of the line, or movement of the wrist. When the jerk is relaxed the minnow will remain in a momentary stationary position as one would appear in life, then the springs acting on the fins 15 cause the lure to jerk back, also imitating a life-like action. This is of great advantage when casting since this action can be made to take place at some distance from the fisherman or from a boat and results in a better chance to hook the fish without frightening it away, this being especially true on clear days.

Due to the fact that any resistance causes the fins to fold back into the grooves, there will be little danger of fouling the lure in weed beds as the fins automatically close over the springs when in this backward position.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. An artificial fish lure comprising a body portion having a slot extending therethrough near the head end, a pin extending upwardly through said slot, fins mounted on said pin adapted to be moved back and forth, and resilient means mounted around said pin tending to hold said fins in a forward position, substantially as set forth.

2. An artificial fish lure comprising a body portion having a slot formed therein near the head end, a pin extending upward through said slot, fins pivotally secured on said pin and having their outer ends twisted downward, springs positioned around said pin, one end of each resting against the body portion and the other end against the rear edge of said fins normally holding said fins in a forward position, substantially as set forth.

3. An artificial fish lure comprising a body portion having a slot formed therein near the head end, said slot being further cut back to form grooves on each side, fins pivotally mounted to work in said slot having their outer ends twisted downward, springs positioned with one end of each resting in said grooves and the other end against the rear edge of said fins tending to hold said fins in a forward position, substantially as set forth.

4. A fish lure comprising a body portion having a slot formed therein near the head end, fins pivotally mounted in said slot and projecting from each side and resilient means in engagement with said fins for holding them in a position perpendicular to said body portion and adapted to permit water pressure to force fins rearwardly as the lure is pulled through the water, substantially as set forth.

5. An artificial fish lure comprising a body portion having hooks secured thereto and a slot extending therethrough near the head end, fins mounted in said slot adapted to move forward and backward, and resilient means normally holding said fins in a forward position, substantially as set forth.

6. An artificial fish lure comprising a body portion having hooks secured thereto and a slot extending therethrough near the head end, and fins pivotally mounted in said slot adapted to move forward and backward, substantially as set forth.

CLYDE C. HOAGE.